United States Patent [19]
Imagawa et al.

[11] Patent Number: 5,969,910
[45] Date of Patent: Oct. 19, 1999

[54] MAGNETIC HEAD AND MAGNETIC DISK APPARATUS PROVIDED THEREWITH

[75] Inventors: Takao Imagawa, Mito; Shigeru Tadokoro, Odawara; Yasunari Tajima, Naka-gun; Hiroshi Kamio, Odawara, all of Japan

[73] Assignee: Hitachi, Ltd., Tokyo, Japan

[21] Appl. No.: 08/858,240

[22] Filed: May 19, 1997

[30] Foreign Application Priority Data

May 20, 1996 [JP] Japan ..................................... 8-124335

[51] Int. Cl.$^6$ ..................................................... G11B 5/127
[52] U.S. Cl. ........................ 360/113; 360/97.01; 360/110; 428/692
[58] Field of Search ................................ 360/113, 97.01, 360/110; 428/692

[56] References Cited

U.S. PATENT DOCUMENTS 5,687,044  11/1997  Saito ........................................ 360/113

Primary Examiner—Stevan A. Resan
Attorney, Agent, or Firm—Kenyon & Kenyon

[57] ABSTRACT

A magnetic head having a magnetoresistive head having a spin valve structure in which a composite magnetic layer of a rotatable magnetizing direction layer and oxide or the like is used for a lower shielding layer and/or an upper shielding layer and a magnetic disk apparatus using such a head are disclosed. According to the invention, a magnetic head having a head of a magnetoresistance effect type generating a high output with low noises and a magnetic disk apparatus having a large quantity with high recording density can be realized.

24 Claims, 7 Drawing Sheets

| No. | STEP | SECTIONAL VIEW |
|---|---|---|
| 1. | FORMING LOWER SHIELDING LAYER | |
| 2. | FORMING MAGNETIC GAP | |
| 3. | FORMING MR SENSOR, ELECTRODE AND MAGNETIC DOMAIN CONTROL LAYERS | |
| 4. | FORMING UPPER MAGNETIC GAP AND SHIELDING LAYERS | |
| 5. | FORMING WRITE HEAD | |
| 6. | FORMING AND PROCESSING PROTECTIVE LAYER | |

|  | INCIDENCE OF HEAD WITH DOMAIN WALLS AT AIR BEARING SURFACE OF LOWER SHIELD | |
|---|---|---|
|  | CASE 1 | CASE 2 |
| COMPOSITE MAGNETIC FILM | 5% | 10% |
| AMORPHOUS MAGNETIC FILM | 70% | 60% |

MAGNETIC HEAD AND MAGNETIC DISK APPARATUS PROVIDED THEREWITH

BACKGROUND OF THE INVENTION

1. Field of the Invention

The present invention relates to a magnetic disk apparatus for magnetically storing and reproducing information, and more particularly, to a magnetic head having a magnetoresistive head for reproducing information by using giant magnetoresistance effect and a magnetic disk apparatus using such a magnetic head.

2. Related Background Art

There are known two types of magnetic heads for magnetically reproducing information by using magnetoresistive (MR) effect. One is a so-called AMR head, which is a type using anisotropic magnetoresistive (AMR) effect in which a micro magnetoresistive change is caused by an angle between the direction of magnetization of a single magnetic film and the direction of a current, and the other is a GMR head, a type using giant magnetoresistive (GMR) effect obtained by a change in an angle between the magnetizing directions of at least two magnetic layers. For example, U.S. Pat. No. 4,755,897 discloses a spin valve structured head for reading signals by fixing the magnetizing direction of one of two magnetic layers (fixed magnetizing direction layer) and by freely turning the other magnetizing direction (rotatable magnetizing direction layer). The spin valve structure can be applied with little change in the structure and manufacturing process of the magnetoresistive head developed as the AMR type. Although the spin valve structured head has an advantage that sensitivity is increased two to four times greater than that of the AMR head, there is a problem such that application of a magnetic field in a magnetizing process is different from that in the AMR head.

A sensor part according to the spin valve structure has a hard bias structure such that a rotatable magnetizing direction layer, for example, NiFe alloy, is formed on a proper underlayer. A non-magnetic interlayer, a magnetoresistive change auxiliary layer, a fixed magnetizing direction layer, and an antiferromagnetic layer are sequentially formed. Further, a magnetic domain control layer for limiting an MR sensor layer only within the sensor part and an electrode are formed. With respect to a bias relation of the spin valve structure, it is necessary to change the magnetizing direction of the rotatable magnetizing direction layer so as to be perpendicular to the height direction of the MR sensor by means of a magnetic field obtained by synthesizing a current bias field Hi, a magnetostatic coupling field Hbt from the end of the fixed magnetizing direction layer, an interlayer coupling field He, and a bias field Hb1 from the magnetic domain control layer by applying a sensing current. Consequently, the magnetizing direction of the rotatable magnetizing direction layer has to be in parallel to the height direction of the MR sensor. A recording magnetic field invades the height direction of the MR sensor and vertically turns the magnetizing direction of the rotatable magnetizing direction layer. In this instance, a signal in which the resistance is minimum when an angle θ with the fixed magnetizing direction layer is 0 and the resistance is maximum when the angle θ is 180° C. is obtained. Consequently, the magnetizing direction of the rotatable magnetizing direction layer has to be directed to the track width direction.

When the surface roughness of the interface is increased, the interlayer coupling is enhanced and aerial distribution is increased. It is necessary to set the thickness of each spin valve structured magnetic layer to be equal to or less than 10 nm and the surface roughness to be 1 nm or less. However, a lower shielding layer as a base on which the sensor part is formed has the thickness of 1 to 2 μm. When crystalline alloys such as NiFe and FeAlSi are applied to the lower shielding layer, the crystal grain size on the surface of the shielding layer is 0.5 to 1 μm. When grain orientations are different, growth rates become different. A wave of 5 to 10 nm in the surface roughness Rrms, which is equal to or larger than each film thickness, is caused. Therefore, in order to use those alloys, it is necessary to set the surface roughness of the magnetic under layer to 1 nm or less by flattening the shielding layer by the etch back or by polishing the lower gap film with sacrifice of the accuracy of the film thickness. On the other hand, when an amorphous film wherein the surface roughness becomes 1 nm or less is used as the lower shielding layer, there are no problems caused by the roughness. In the AMR head, there is no inconvenience when the amorphous layer is used as the lower shielding layer.

However, if the amorphous shielding layer is applied to the GMR head, when heat treatment for magnetization of the fixed magnetizing direction layer is performed there can occur instances wherein the magnetic domain structure deteriorates according to the temperature of the heat treatment, and the time and the direction of the applied field, so that the waveform fluctuates. The waveform fluctuation is characterized in that asymmetry is lost after operating the write head and returns to its former state after recording operations of a few times to hundreds of times. This might constitute the reason that the magnetic domains appear in the shielding layer which are located at a distance of 0.1 to 0.2 μm from the sensor part and are coupled magnetostatically to the magnetization of the magnetic domain control layer and lose the controllability of the magnetic domain, or the magnetostatic coupling of the shielding layer and the magnetoresistive film is changed, thereby changing bias. The following reason is considered as a cause of the appearance of the magnetic domains in the shielding layer. A fabricating step of the magnetoresistive head consists of a wafer step and a post step. The wafer step comprises: a step (step 1) of forming a lower shielding layer on an insulating layer applied on a substrate; a step (step 2) of forming a lower gap layer; a step (step 3) of forming a spin valve structured layer, an electrode, and a magnetic domain control layer; a step (step 4) of forming an upper gap layer, and after that, forming an upper shielding layer; a step (step 5) of forming a write head gap layer, an inductive coil, an interlayer insulating film, and an upper magnetic core; and a step (step 6) of forming a protective layer, a terminal, and the like. In the post step, a process for the air bearing surface, and cutting, adhering using a gimbal, and the like are performed.

In the post step, the heat treatment by applying the magnetic field cannot be given since a slider chip is not easy to handle, it is feared that a slider is deformed, and the like. In the wafer step, the steps in which the heat treatment can be given are limited according to the magnetization temperature of the fixed magnetizing direction layer. Specifically, when NiMn that is required to be subjected to the heat treatment at 250° C. or higher is used for fixing the magnetization of the magnetizing direction layer, since the heat resisting temperature of the write head interlayer insulating film is 230° C., the heat treatment has to be given by the end of the step 4. In this case, there is a problem that the magnetization of the shielding layer oriented in the height direction of the MR sensor is not returned by the following heat treatment in the track width direction. On the other hand, since NiO has to be cooled from 200° C. in the magnetic field, it has to be done in the step 6. In this case, the final heat treatment in the height direction of the MR sensor is given to the lower shielding layer and the magnetization is disturbed.

SUMMARY OF THE INVENTION

It is an object of the invention to provide a magnetic head having a spin valve structured head having magnetoresistive effect which solves the problems of the magnetic field design and stably generates high power with low noise.

It is another object of the invention to provide a magnetic disk apparatus having a high signal reading ratio, which can perform high density recording.

A magnetoresistive head of the invention has a sensor part of a spin valve structure where a material in which activation energy is small is used at least in a part of a shielding layer.

Further, the magnetoresistive head may have magnetic domain control means.

As the material in which the activation energy is small, a composite magnetic material obtained by mixing a non-soluble substance such as oxide, nitride, and the like to a rotatable magnetizing direction material such as NiFe is especially suitable.

According to the invention, a magnetic head for high density magnetic recording which can generates a noiseless high output can be realized. By using the magnetic head, a magnetic disk apparatus having a high signal reading radio which can record signals with high density can be realized.

DETAILED DESCRIPTION OF THE PREFERRED EMBODIMENT

Figure 1:
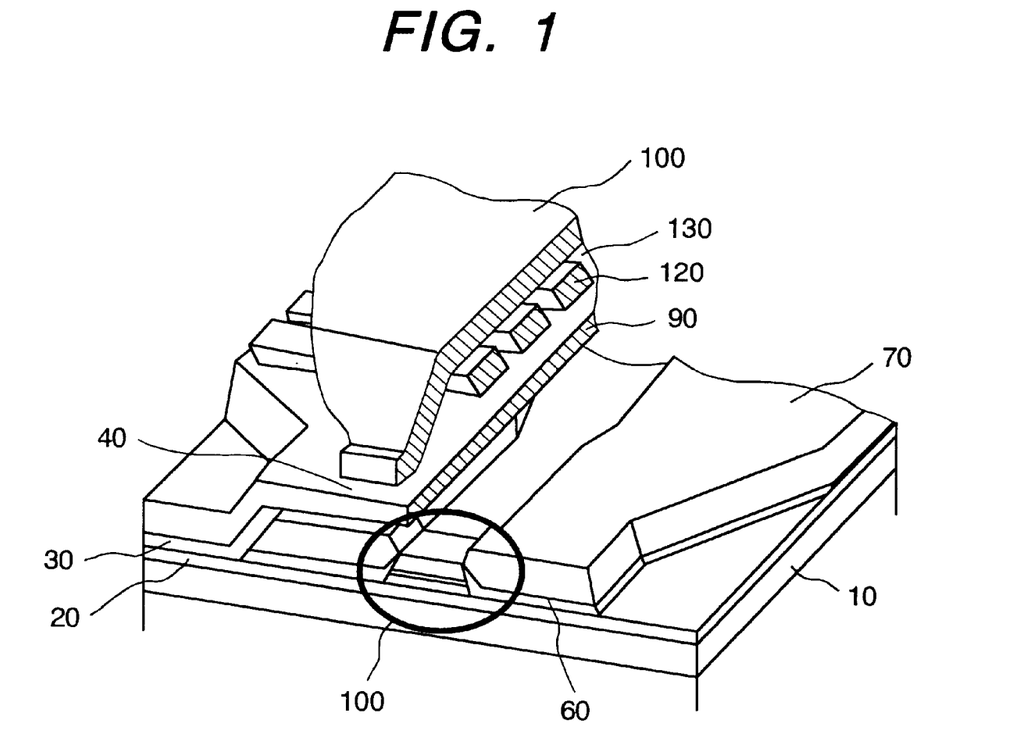
FIG. 1 is a schematic diagram showing a construction of a magnetic head of an embodiment according to the invention.

FIG. 1 shows an embodiment in which a magnetoresistive head using the composite magnetic film is fabricated. A composite magnetic film of 2 $\mu$m obtained by adding 4 mol % of $SiO_2$ to NiFe is formed and used as a lower shielding layer 10. The surface roughness of the lower shielding layer 10 is 0.8 nm. Al2O3 is applied as a lower gap film 20 of 0.15 $\mu$m. A spin valve film 100 is formed in such a manner that a rotatable magnetizing direction layer of Ta having a thickness of 5 nm and NiFe having a thickness of 10 nm, a fixed magnetizing direction layer of Cu having a thickness of 5 nm, Co having a thickness of 3 nm, and NiFe having a thickness of 8 nm, are sequentially laminated, and continuously, NiMn of 15 nm is formed. NiMn and NiFe in the fixed magnetizing direction layer are exchanged and coupled by a heat treatment with field applied to the height direction of the MR sensor at 260° C. for four hours. A magnetic domain control film 60 and an electrode 70 are formed by a hard bias structure. $Al_2O_3$ of 0.1 $\mu$m is formed and used as an upper gap film 30. After that, the composite magnetic film (upper shielding layer) 90 of 3 $\mu$m, a write head gap film 40 of $Al_2O_3$, an inductive coil 120, an insulating layer 130, an upper magnetic core 110 of the write head, and a protective layer 50 made of $Al_2O_3$, and terminals are sequentially formed. A magnetic field is applied in the direction of a track width and a heat treatment is given at 180° C. for one hour. The magnetic field strength is 3 kOe. The write head is formed by plating. The magnetic field is first applied to the height direction of the MR sensor and magnetization is oriented to the magnetic path of the write head and is turned toward the track width direction by the final heat treatment, thereby controlling the magnitude of the anisotropic magnetic field.

On the other hand, in a magnetoresistive head (not shown) as a target to be compared with the magnetoresistive head made of the composite magnetic material according to the invention, an amorphous film of CoNbZr is formed as a lower shielding layer and a heat treatment is given at 250° C. for three hours just after the formation. The same spin valve part, magnetizing conditions, magnetic domain control part, and electrode as those in the embodiment of FIG. 1 are used. NiFe alloy of 3 $\mu$m is formed as the upper shielding layer. The final heat treatment at 180° C. for one hour after the formation of the write head and the terminals is given by the magnetic field applied in the track width direction.

Figure 2:
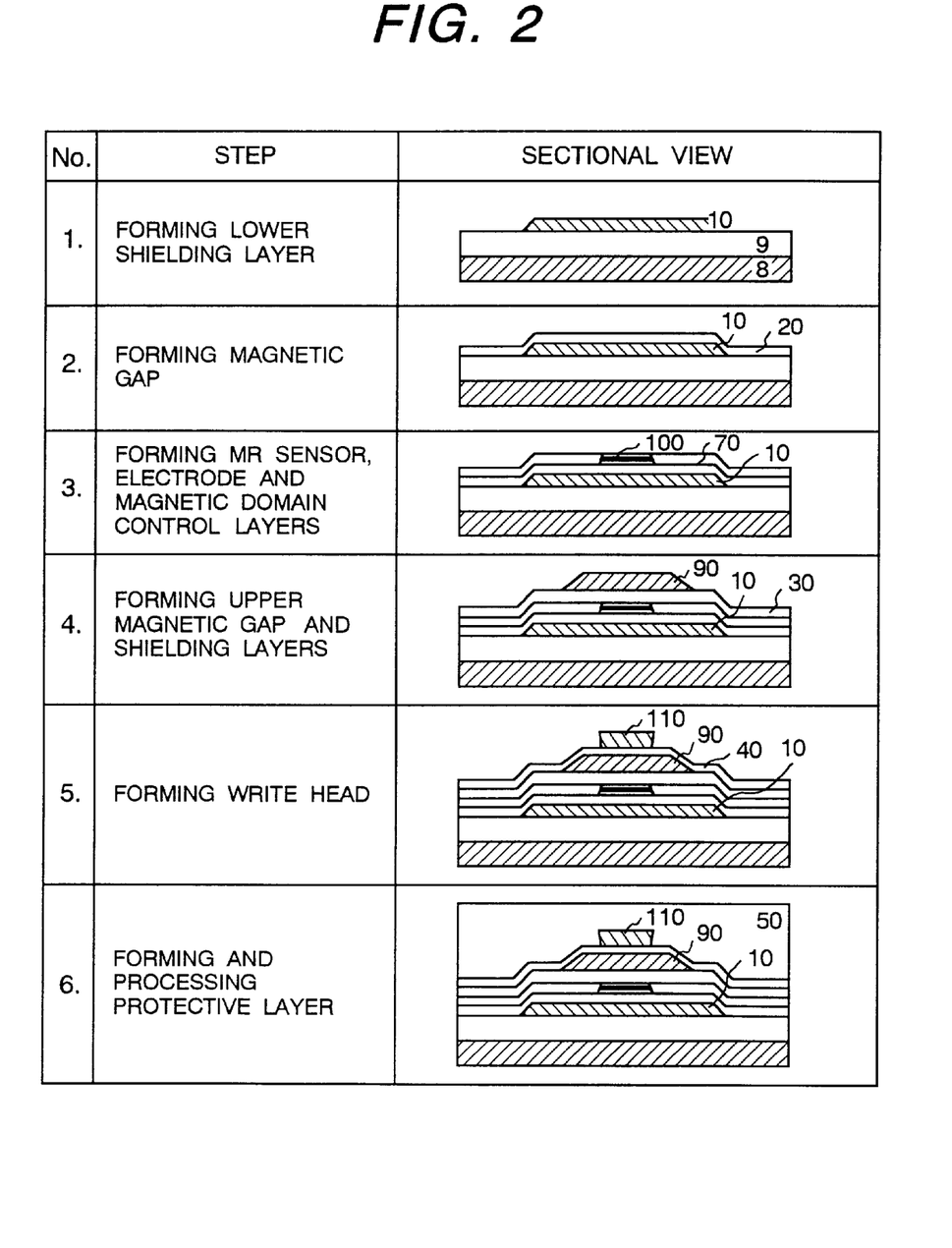
FIG. 2 is a diagram showing a process for fabricating the magnetic head of the invention.

FIG. 2 shows cross-sections at a position on a wafer and where the air bearing surface is supposed to be positioned, to illustrate fabricating steps. The lower shielding layer 10 is formed on a substrate 8 and an insulating layer 9 (step 1). After forming the lower gap film 20 (step 2), the spin valve layer 100, an electrode, and the magnetic domain control layer 70 are formed (step 3). After forming an upper gap film 30, the upper shielding layer 90 is applied (step 4). The write head gap 40 is formed, and after that, the inductive coil, insulating layer, and upper magnetic core 110 are formed (step 5). The protective layer 50, terminals, and the like are formed (step 6). By performing the procedures of the steps 1 to 6, the wafer step is completed. After that, a post step such as an air bearing surface process, cutting, gimbal adhesion, and the like is performed, thereby obtaining the head.

Figure 3:
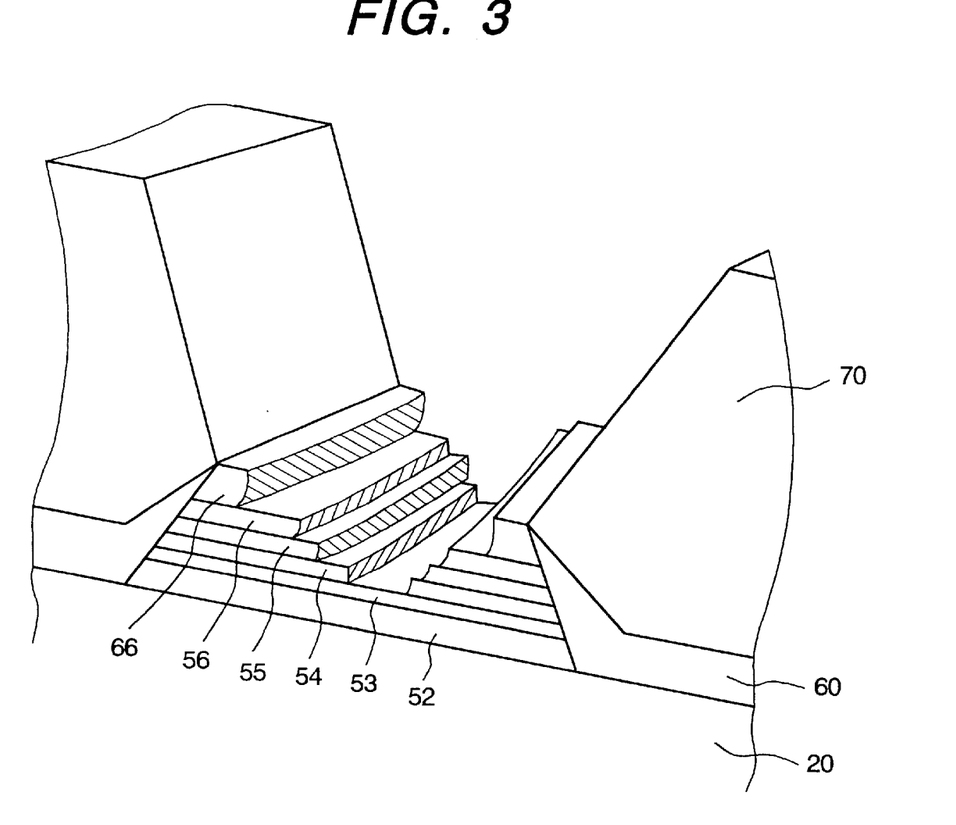
FIG. 3 is a schematic diagram showing a spin valve structure of FIG. 1.

FIG. 3 shows the sensor part 100 in detail, which has the spin valve structure shown in FIG. 1. In the example, the upper magnetic film is used as a fixed magnetizing direction layer and the lower magnetic film is used as a rotatable magnetizing direction layer. The sensor part 100 has a hard bias structure in which a rotatable magnetizing direction layer 53 such as NiFe alloy is formed on a proper underlayer 52. A non-magnetic interlayer 54, a magnetoresistive change auxiliary layer 55 not necessarily needed, a fixed magnetizing direction layer 56, and an antiferromagnetic layer 66 are sequentially formed. An MR sensor layer is limited only in the sensor part, and simultaneously, the magnetic domain control layer 60 and the electrode 70 are formed.

Figure 4:
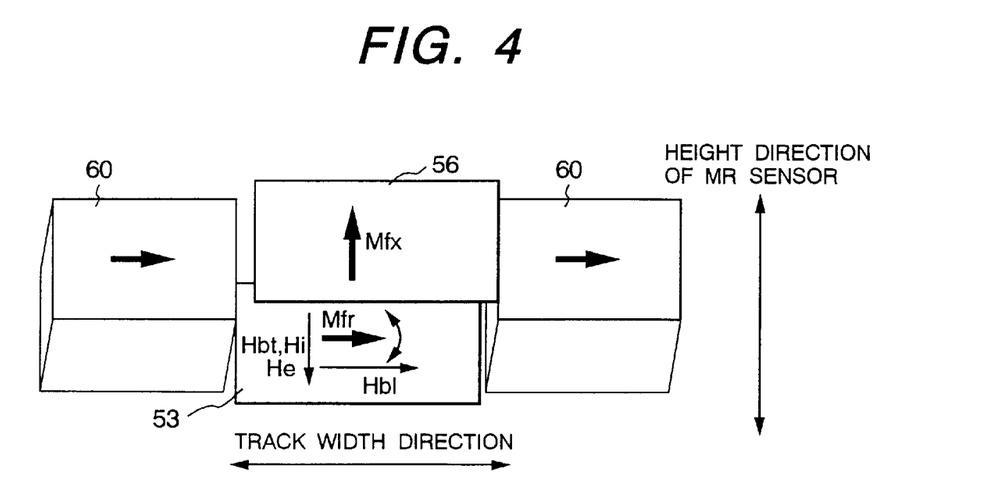
FIG. 4 is a diagram showing a bias relation of a spin valve.

FIG. 4 shows a bias relation of the spin valve structure. It is necessary to direct the magnetization of the rotatable magnetizing direction layer 53 so as to be perpendicular to the height direction of the MR sensor by a magnetic field obtained by synthesizing a current bias field Hi, a magnetostatic coupling field Hbt from the end of the fixed magnetizing direction layer 56, an interlayer coupling field He and a bias field Hb1 from the magnetic domain control layer 60 by a sensing current supplied. Consequently, the magnetizing direction of the fixed magnetizing direction layer has to be in parallel to the height direction of the MR sensor. The recording magnetic field invades the height direction of the MR sensor and vertically turning the magnetization of the rotatable magnetizing direction layer. In this instance, a signal in which the resistance is minimum when an angle θ with the fixed magnetizing direction layer is 0 and the resistance is maximum when the angle is 180° is obtained. It is, therefore, necessary to direct the magnetization of the rotatable magnetizing direction layer to the track width direction.

Figure 5A:
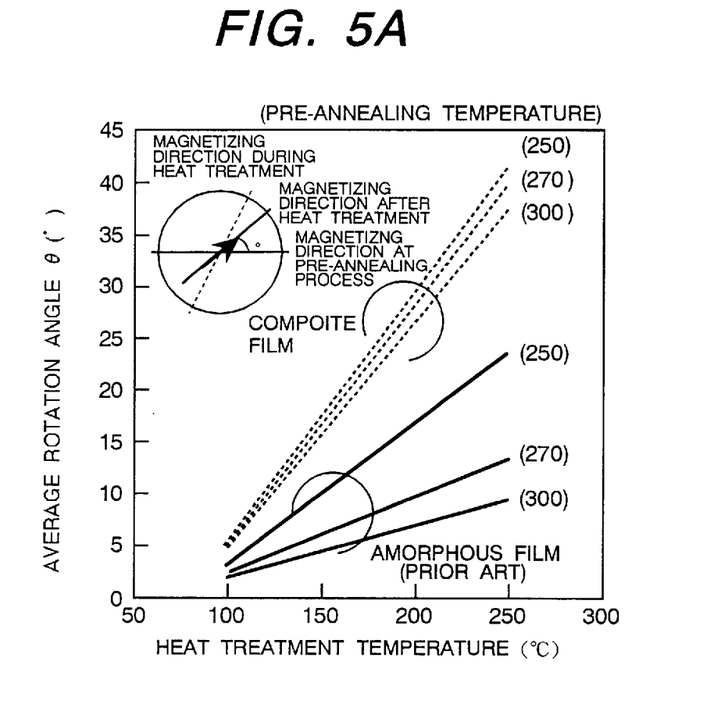
FIG. 5 is a diagram illustrating heat treatment characteristics of a composite magnetic film used for a magnetic head of a magnetoresistive effect type according to the invention.
Figure 5B:
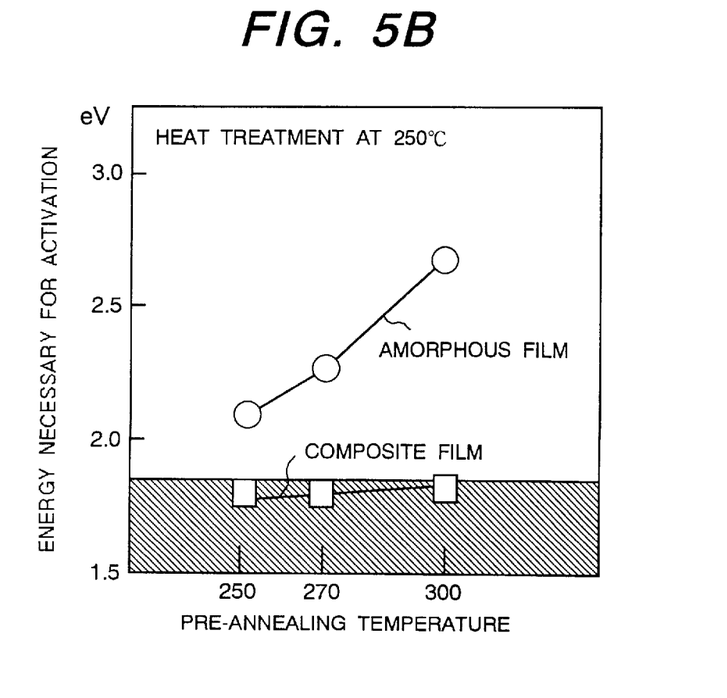

FIG. 5A shows a method of measuring activation energy of the composite magnetic material used for the shielding layer. A pre-annealing (heat treatment) process was performed on a sample by applying a magnetic field in the direction as shown in the diagram, and after that, the magnetizing direction was inclined by 45° and the heat treatment was given. The heat treatment was given at temperatures from 100° C. to 250° C. for three hours, respectively. The magnetizing direction after the heat treatment is shown with temperatures. The heat treatment was given to the composite film according to the invention shown by dotted lines, in which 4 mol % of $SiO_2$ is added to NiFe. For comparison, results of the CoNbZr amorphous film are also shown by solid lines. In the diagram, even the pre-annealing temperature is increased to 250 to 300° C., the rotation in the composite film at the temperature of 250° C. is approximately 45° and there is little influence by the pre-annealing. On the other hand the rotation in the amorphous film is about 23° which is approximately one-half that of the composite film after the pre-annealing at 250° C. and the heat treatment at 250° C. According to "Thin magnetic film engineering" compiled by Iida, Publishing Division of Maruzen Co. Ltd., p. 136, a rotation angle β at this time is expressed by the following equation.

$$\tan 2\beta = Ku2/Ku1 \qquad (1)$$

where, Ku1 is magnetic anisotropy remained in the original direction and Ku2 is magnetic anisotropy generated in the 45° direction. It is assumed here that magnetic anisotropy after the pre-annealing process is expressed as Ku0, and Ku1+Ku2 is equal to Ku0 in the heat treatment at a temperature equal to or lower than the pre-annealing temperature. FIG. 5B shows activation energy obtained with respect to the composite film and the amorphous film, respectively, on the basis of the method shown in "Journal of Applied Physics" Vol. 53, p. 2279, 1982. As for the composite film, even the pre-annealing temperature is increased to 300° C., the increase in the activation energy is small such as 1.7 to 1.8 eV. On the other hand in the amorphous film, when the pre-annealing temperature is increased from 250° C. to 300° C., the activation energy is increased from 2.2 to 2.7 eV. Since the anisotropy rotation in the composite film is hardly influenced even by the pre-annealing at 300° C., it is found that 1.8 eV or less of the activation energy is sufficient. Although the activation energy of the amorphous film is small just after formation by sputtering, it increases to 2 eV or larger by heating after the head forming process.

Figure 6:
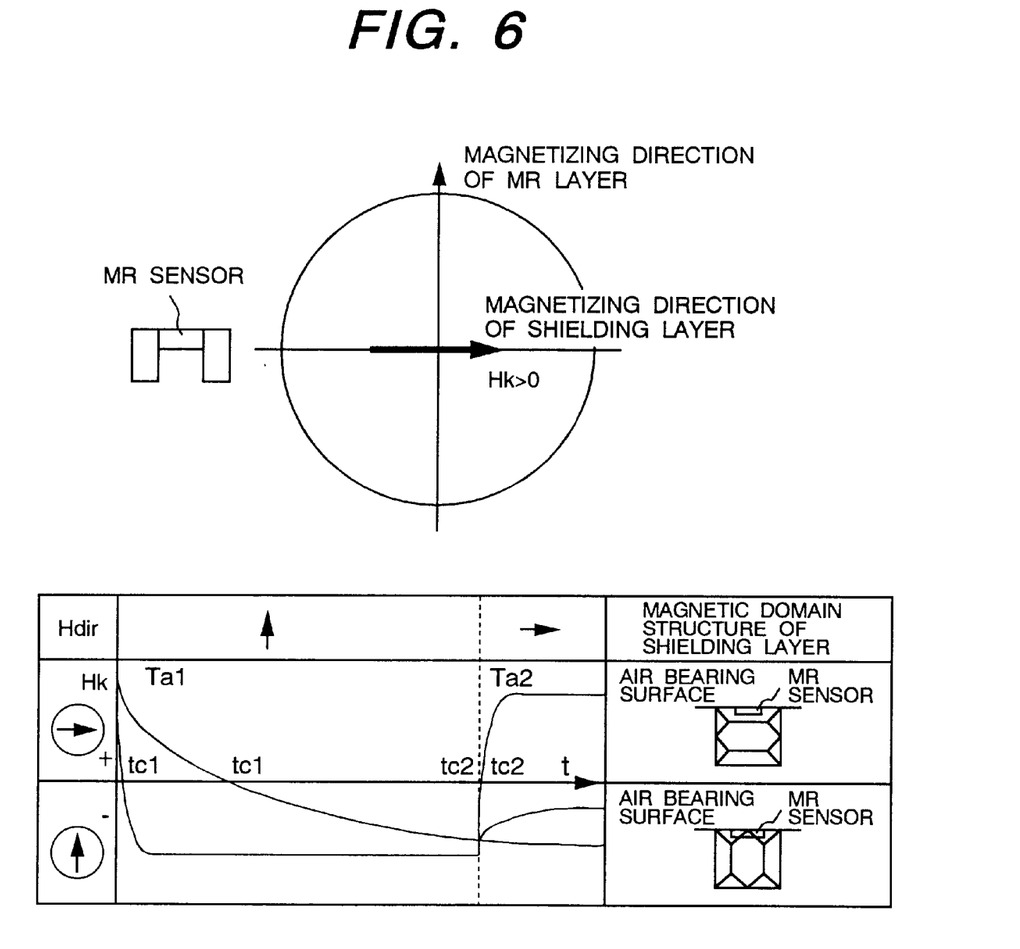
FIG. 6 is a diagram showing the magnetizing direction of a shielding layer and magnetic domains of the shielding layers when a fixed magnetizing direction layer is magnetized.

FIG. 6 shows the change in anisotropy of the composite magnetic material by the heat treatment, which is used for the magnetoresistive head according to the invention. In the diagram, when the magnetization is oriented in the track width direction of the MR sensor as a final magnetizing direction of the shielding layer, the positive magnetic anisotropy is obtained and an anisotropic magnetic field Hk is positive. In the case where the magnetizing direction perpendicularly crosses the magnetizing direction of the shielding layer (magnetizing direction of the fixed magnetizing direction layer), the negative magnetic anisotropy is obtained and the anisotropic magnetic field Hk is turned to be negative. As shown in the diagram, in the positive magnetic anisotropy, there is no magnetic wall in the shielding layer having the air bearing surface and the magnetization of the MR sensor is not disturbed. In the negative magnetic anisotropy, however, magnetic walls at 90° C. occur in the shielding layer having the air bearing surface and the magnetic domain control layer of the MR sensor or the MR sensor is magnetically influenced. When performing heat treatment on a material having positive magnetic anisotropy by applying the magnetic field to the magnetizing direction of the fixed magnetizing direction layer, the higher a heat treatment temperature Ta1 is or the smaller the anisotropic magnetic activation energy of the magnetic material is, the shorter the time tc1 required for the magnetic anisotropy to be turned from the track width direction to the magnetizing direction of the MR layer. A fine line shows the case of the amorphous material. In case of CoNbZr, Hk=120 e just after the formation of the film, the magnetic anisotropy was easily turned by the heat treatment at 250° C. for 30 minutes and Hk became −60 e. In order to return the direction to the original one, the heat treatment in the track width direction was given. More than three hours were required so that Hk became smaller than 0. Hk was as small as 2 to 30 e and the magnetic domain structure was not stabilized.

The above action is due to the stabilizing effect of the heat treatment on the amorphous material. In an amorphous structure having large gaps just after fabrication, magnetic atoms are easily rearranged and the magnetizing direction can be easily reversed. However, it indicates that it is difficult to again reverse the magnetizing direction after completion of the process using the hours-long heat treatment. It is important to determine at which stage the magnetic filed is applied in the magnetizing direction of the MR layer during the process. Since the pattern of the shielding layer is large and the shape is isotropic, means for adjusting magnetic deformation and controlling the magnetic anisotropy by using magnetic elastic effect cannot be applied.

On the other hand, the thick line shows a case of the magnetic head using the composite magnetic film according to the invention, in which 4 to 5 mol % of $SiO_2$ is added to NiFe. Time tc1' required for the turn was 10 minutes. Hk was stable after change from +80 e to −80 e. Even the magnetizing direction was again reversed after three hours, Hk was recovered to 80 e after 10 minutes. That is, it shows that Hk is not stabilized by the heat treatment. It can be considered that the NiFe grain growth in the film is inhibitted by oxide and a structure having many grain boundaries is obtained, and that the number of grain boundaries is hardly decreased by the recovery in the heat treatment at 250° C. When such a material is used as the shielding material, the anisotropy can be recovered by the heat treatment regardless of the changes in the magnetic field during the process.

Figure 7:
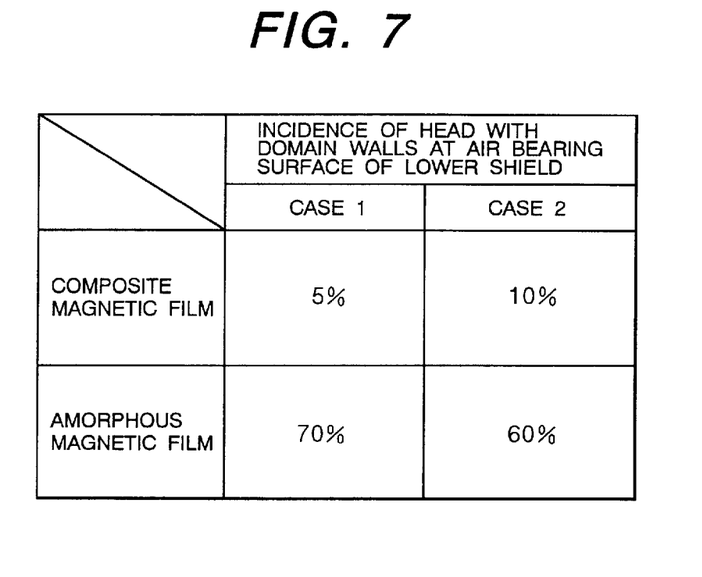
FIG. 7 is a diagram showing effect the of eliminating magnetic walls in the shielding layer according to the invention.

With respect to the head according to the first embodiment in the invention and the head as the comparison example, the magnetic domains in the shielding layer are observed by MFM after processing the air bearing surface. In FIG. 7, the percentage of presence or occurrence of the magnetic walls in the lower shielding layers of 100 heads according to the invention and 100 heads for comparison is shown. The percentage of occurrence of the magnetic walls in the lower shielding layer according to the first embodiment is 5% and that in the upper shielding layer is 0%. In the comparison example, however, the percentage of occurrence of the magnetic walls in the lower shielding layer is 70% and that in the upper shielding layer is 2%.

In the second embodiment, the same shielding layer is used and an $Al_2O_3$ gap layer of 0.1 μm is applied as a sensor part, the spin valve part is formed by a fixed magnetizing layer of Ni of 30 nm, NiFe of 0.5 nm, and Co of 5 nm, a rotatable magnetizing direction layer of Cu of 5 nm and NiFe of 10 nm, and Ta of 5 nm, and an $Al_2O_3$ gap layer of 0.14 μm is formed. After a terminal is formed and the heat treatment is given at 200° C. for 30 minutes by the magnetic field applied in the height direction of the MR sensor, the heat treatment is given by the magnetic field applied in the track width direction at 150° C. for three hours. In this case, according to the second embodiment, the percentage of occurrence of the magnetic walls in the lower shielding layer is 10% and that in the upper shielding layer is 0%. With respect to the conventional amorphous magnetic film, the percentage of occurrence of the magnetic walls in the lower shielding layer is 60% and that in the upper shielding layer is 3%. In addition to $SiO_2$, an oxide such as $ZrO_2$, $TaO_2$, $Al_2O_3$ or the like, or a compound such as BN, WC or the like can be also used as the material of the composite magnetic film. It is preferable that any additional amount be 2 to 10 mol % with respect to any case. When the additional amount is too small, the crystal particle size is enlarged and the surface roughness is increased. When the additional amount exceeds 10 mol %, heat conductivity of the shielding layer deteriorates and a temperature rise in the MR sensor is caused by the current supply.

Although the composite magnetic shielding layer is used in both of the upper and lower layers in the head according to the embodiment of the invention, it is also possible that the composite magnetic film is applied only to the lower shielding layer and the amorphous film or a crystalline film such as Ni or Fe is used as the upper shielding layer. The method of turning the magnetic anisotropy of the write head after formation is useful especially when a material having a highly saturated magnetic flux density such as CoNiFe in which the magnetic anisotropy is large and the magnetic permeability is small is used.

Figure 8:
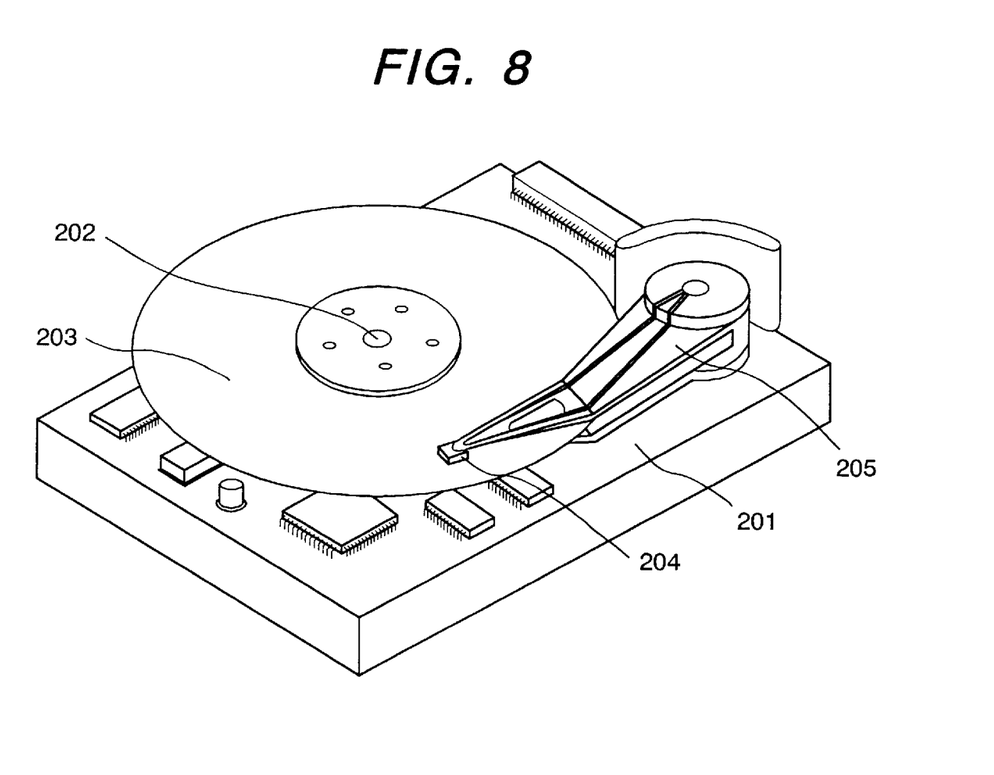
FIG. 8 is a diagram illustration a construction of a magnetic disk apparatus using the magnetic head of the invention.

FIG. 8 shows a magnetic disk apparatus using the magnetoresistive head according to the invention. The apparatus basically comprises: a rotatable magnetic disk 203; a head 204 having magnetoresistive effect for recording and reproducing signals; an actuator 205; and a signal processor. The magnetic disk is rotated 4000 to 8000 times per minute by a rotary shaft 202 and the magnetoresistive head 204 is floated above the magnetic disk at an interval of tens to hundreds angstroms. When an inductive part of the head 204 executes a writing operation, a recording binary digit string is formed concentrically by the rotation of the disk. Further, the head is moved in the radial direction by the actuator 205, thereby recording data on the whole disk. A predetermined current is flowed to the magnetoresistive head of the head 204 and the head 204 is moved by the actuator 205 to a predetermined position. After that, a change in resistance of the sensor part is obtained as a change in voltage of the head terminal. A reproduction signal is shaped and converted to data by an integrated circuit arranged on a base 201 and is transferred to an external apparatus such as a computer.

In the magnetic disk apparatus using the magnetic head according to the invention shown in FIG. 8, the quality of a reproduction waveform is improved as compared with a case of using the conventional head and a signal read error ratio of the apparatus is improved from $10^{-9}$ to $10^{-11}$, that is, by more than two digits. There is consequently an advantage that the recording density of the apparatus can be increased by 50%.

A further embodiment of the invention will be described hereinbelow.

Figure 9:
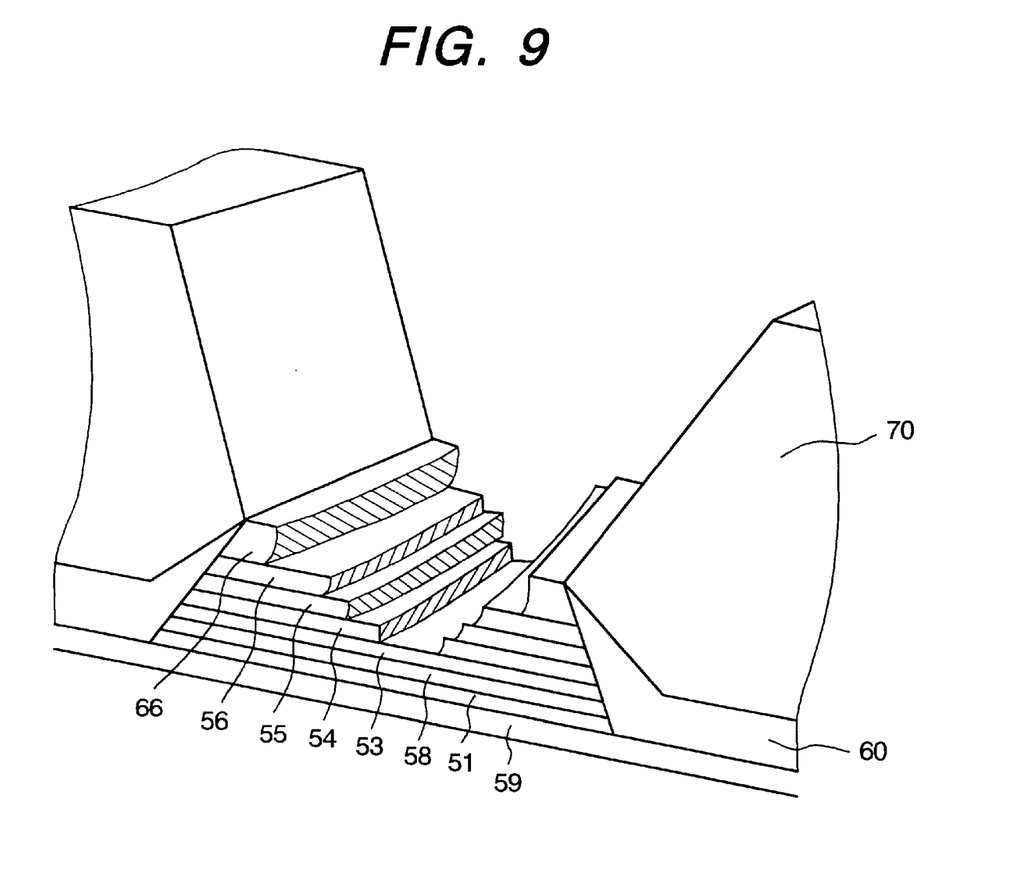
FIG. 9 is a schematic diagram showing a dual spin valve structure used for the invention.

In FIG. 9, a dual spin valve head having a construction similar to that of FIG. 3 is fabricated by forming a lower fixed magnetizing direction layer 51 and a spacer Ta layer 58 on an NiO layer 59. As the lower shielding layer, a material in which 4 mol % of $SiO_2$ is added to NiFe is used. The heat treatment to the fixed magnetizing direction layer and the NiMn layer is given in step 3 in FIG. 2. The magnetic field is applied in the height direction of the MR sensor after completion of the head and the heat treatment is given at 200° C. for 30 minutes. After that, the magnetic field is applied in the track width direction and the heat treatment is given at 160° C. for three hours, thereby magnetizing direction of the shielding layer is also oriented in the track width direction. According to the head, an output higher than that of a typical spin valve head by 60% is obtained. In the magnetic disk apparatus using the head, the recording density is increased by 30% as compared with that of an apparatus using the typical spin valve head.

According to the above embodiment, a permanent magnetic film such as CoCrPt is used as the magnetic domain control layer. When the track width of the sensor part is 1 μm or narrower, the magnetic domain control layer may be omitted. In this case, it is necessary to reduce the thickness of a spacer film and to enhance a coupling magnetic field from the fixed magnetizing direction layer. Although reproduction sensitivity is reduced, reliability of electrical connection at the electrode end is improved.

What is claimed is:

1. A magnetic head comprising:
   a magnetoresistive head having: a sensor part including a magnetoresistive film for converting a magnetic signal to an electric signal by using the magnetoresistive effect generated by a relative angle between magnetizing directions of at least two magnetic layers and a pair of electrodes for flowing a signal detection current to the magnetoresistive film; and lower and upper magnetic shielding layers for sandwiching the sensor part and forming a magnetic gap layer; and
   a head for recording formed on the upper magnetic shielding layer of the magnetoresistive head,
   wherein a material in which activation energy required to change magnetic anisotropy is 1.8 eV or less is used at least in a part of the lower magnetic shielding layer.

2. The magnetic head according to claim 1, wherein the material in which activation energy required to change magnetic anisotropy is 1.8 eV or less is used at least in a part of the upper magnetic shielding layer.

3. The magnetic head according to claim 1, wherein the magnetoresistive film is a rotatable magnetizing direction layer sandwiched by two fixed magnetizing direction layers.

4. A magnetic head comprising:
   a magnetoresistive head having: a sensor part which includes a magnetoresistive film for converting a magnetic signal to an electric signal by using the magnetoresistive effect generated by a relative angle between magnetizing directions of at least two magnetic layers, a pair of electrodes for flowing a signal detection current to the magnetoresistive film, and a magnetic domain control layer for making the magnetoresistive film a single magnetic domain; and lower and upper magnetic shielding layers for sandwiching the sensor part and forming a magnetic gap layer; and a head for recording formed on the upper magnetic shielding layer of the magnetoresistive head, wherein a material in which activation energy required to change magnetic anisotropy is 1.8 eV or less is used at least in a part of the lower magnetic shielding layer.

5. The magnetic head according to claim 4, wherein the material in which activation energy required to change magnetic anisotropy is 1.8 eV or less is used at least in a part of the upper magnetic shielding layer.

6. The magnetic head according to claim 4, wherein the magnetoresistive film is a rotatable magnetizing direction layer sandwiched by two fixed magnetizing direction layers.

7. A magnetic head comprising:

a magnetoresistive head having: a sensor part including a magnetoresistive film for converting a magnetic signal to an electric signal by using the magnetoresistance effect generated by a relative angle between magnetizing directions of at least two magnetic layers, and a pair of electrodes for flowing a signal detection current to the magnetoresistive film; and lower and upper magnetic shielding layers for sandwiching the sensor part and forming a magnetic gap layer; and a head for recording formed on the upper magnetic shielding layer of the magnetoresistive head, wherein a composite magnetic film in which 2 to 10 mol % of oxide or nitride is added to a rotatable magnetizing direction material is used at least in a part of the lower magnetic shielding layer.

8. The magnetic head according to claim 7, wherein a composite magnetic film in which 2 to 10 mol % of oxide or nitride is added to a rotatable magnetizing direction material is used at least in a part of the upper magnetic shielding layer.

9. The magnetic head according to claim 7, wherein the magnetoresistive film is a rotatable magnetizing direction layer sandwiched by two fixed magnetizing direction layers.

10. A magnetic head comprising:

a magnetoresistive head having: a sensor part including a magnetoresistive film for converting a magnetic signal to an electric signal by using the magnetoresistance effect generated by a relative angle between magnetizing directions of at least two magnetic layers, a pair of electrodes for flowing a signal detection current to the magnetoresistive film, and a magnetic domain control layer for making the magnetoresistive film a single magnetic domain; and lower and upper magnetic shielding layers for sandwiching the sensor part and forming a magnetic gap layer; and a head for recording formed on the upper magnetic shielding layer of the magnetoresistive head, wherein a composite magnetic film in which 2 to 10 mol % of oxide or nitride is added to a rotatable magnetizing direction material is used at least in a part of the lower magnetic shielding layer.

11. The magnetic head according to claim 10, wherein the composite magnetic film in which 2 to 10 mol % of oxide or nitride is added to a rotatable magnetizing direction material is used at least in a part of the upper magnetic shielding layer.

12. The magnetic head according to claim 10, wherein the magnetoresistive film is a rotatable magnetizing direction layer sandwiched by two fixed magnetizing direction layers.

13. A magnetic disk apparatus comprising:

a magnetic disk;

a magnetic head for recording or reproducing signals to/from the magnetic disk, having: a magnetoresistive head which includes a sensor part having a magnetoresistive film for converting a magnetic signal to an electric signal by using the magnetoresistance effect generated by a relative angle between magnetizing directions of at least two magnetic layers and a pair of electrodes for flowing a signal detection current to the magnetoresistive film, and lower and upper magnetic shielding layers for sandwiching the sensor part and forming a magnetic gap layer; and a head for recording formed on the upper magnetic shielding layer of the magnetoresistive head, wherein a material in which activation energy required to change magnetic anisotropy is 1.8 eV or less is used at least in a part of the lower magnetic shielding layer.

14. The apparatus according to claim 13, wherein the material in which activation energy required to change magnetic anisotropy is 1.8 eV or less is used at least in a part of the upper magnetic shielding layer.

15. The apparatus according to claim 13, wherein the magnetoresistive film is a rotatable magnetizing direction layer sandwiched by two fixed magnetizing direction layers.

16. A magnetic disk apparatus comprising:

a magnetic disk; and a magnetic head for recording or reproducing signals to/from the magnetic disk, having: a magnetoresistive head which includes a sensor part having a magnetoresistive film for converting a magnetic signal to an electric signal by using the magnetoresistance effect generated by a relative angle between magnetizing directions of at least two magnetic layers, a pair of electrodes for flowing a signal detection current to the magnetoresistance effect film, and a magnetic domain control layer for making the magnetoresistive film a single magnetic domain, and lower and upper magnetic shielding layers for sandwiching the sensor part and forming a magnetic gap layer; and a head for recording formed on the upper magnetic shielding layer of the magnetoresistive head, wherein a material in which activation energy required to change magnetic anisotropy is 1.8 eV or less is used at least in a part of the lower magnetic shielding layer of the magnetic head.

17. The apparatus according to claim 16, wherein the material in which activation energy required to change magnetic anisotropy is 1.8 eV or less is used at least in a part of the upper magnetic shielding layer of the magnetic head.

18. The apparatus according to claim 16, wherein the magnetoresistive film of the magnetic head is a rotatable magnetizing direction layer sandwiched by two fixed magnetizing direction layers.

19. A magnetic disk apparatus comprising:

a magnetic disk; and a magnetic head for recording or reproducing signals to/from the magnetic disk, having: a magnetoresistive head which includes a sensor part having a magnetoresistive film for converting a magnetic signal to an electric signal by using magnetoresistance effect generated by a relative angle between magnetizing directions of at least two magnetic layers and a pair of electrodes for flowing a signal detection current to the magnetoresistive film, and lower and upper magnetic shielding layers for sandwiching the sensor part and forming a magnetic gap layer; and a head for recording formed on the upper magnetic shielding layer of the magnetoresistive head, wherein a composite magnetic film in which 2 to 10 mol % of oxide or nitride is added to a rotatable magnetizing direction material is used at least in a part of the lower magnetic shielding layer of the magnetic head.

20. The apparatus according to claim 19, wherein the composite magnetic film in which 2 to 10 mol % of oxide or nitride is added to a rotatable magnetizing direction material is used at least in a part of the upper magnetic shielding layer of the magnetic head.

21. The apparatus according to claim 19, wherein the magnetoresistive film of the magnetic head is a rotatable magnetizing direction layer sandwiched by two fixed magnetizing direction layers.

22. A magnetic disk apparatus comprising:

a magnetic disk; and a magnetic head for recording or reproducing signals to/from the magnetic disk, having: a magnetoresistive head which includes a sensor part having a magnetoresistive film for converting a magnetic signal to an electric signal by using the magnetoresistance effect generated by a relative angle between magnetizing directions of at least two magnetic layers, a pair of electrodes for flowing a signal detection current to the magnetoresistive film, and a magnetic domain control layer for making the magnetoresistive film a single magnetic domain, and lower and upper magnetic shielding layers for sandwiching the sensor part and forming a magnetic gap layer; and a head for recording formed on the upper magnetic shielding layer of the magnetoresistive head, wherein a composite magnetic film in which 2 to 10 mol % of oxide or nitride is added to a rotatable magnetizing direction material is used at least in a part of the lower magnetic shielding layer of the magnetic head.

23. The apparatus according to claim 22, wherein the composite magnetic film in which 2 to 10 mol % of oxide or nitride is added to a rotatable magnetizing direction material is used at least in a part of the upper magnetic shielding layer of the magnetic head.

24. The apparatus according to claim 22, wherein the magnetoresistive film of the magnetic head is a rotatable magnetizing direction layer sandwiched by two fixed magnetizing direction layers.

* * * * *